Oct. 31, 1950        F. DIBERT        2,527,622
AUTOMATIC TEMPERATURE REGULATOR
Filed Aug. 11, 1948        2 Sheets—Sheet 1
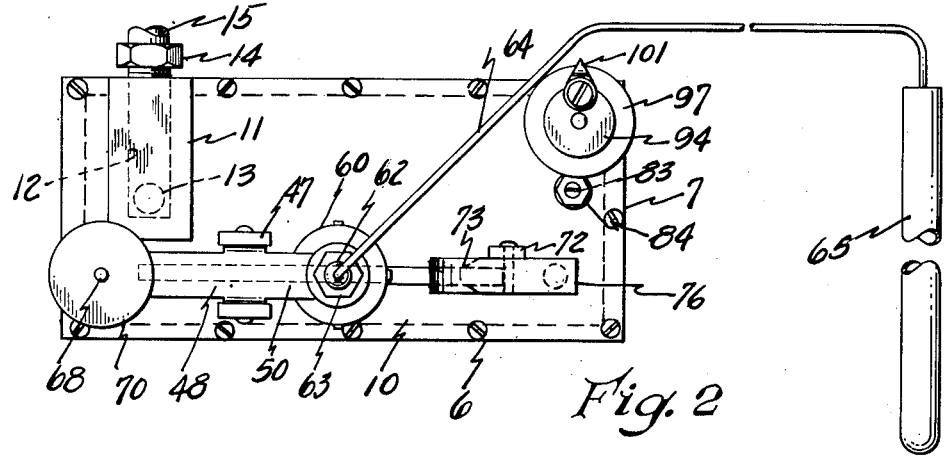
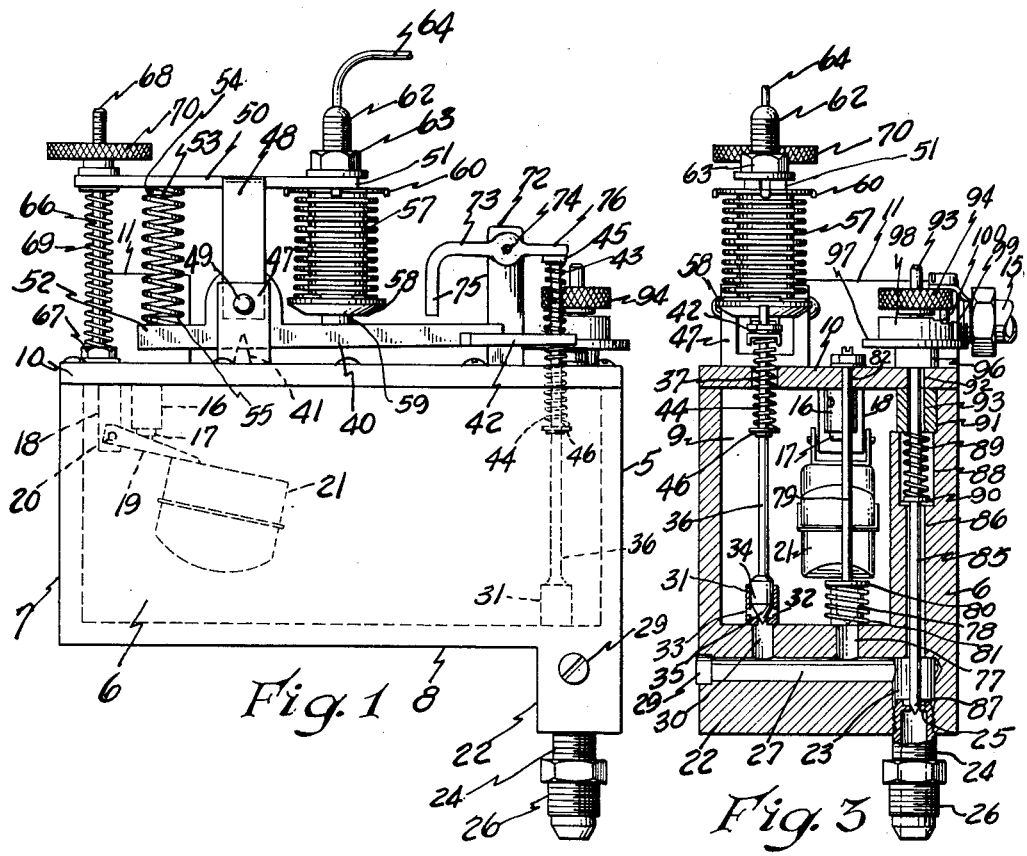
INVENTOR.
Fred Dibert
BY
Frank C. Fearman.
ATTORNEY Oct. 31, 1950     F. DIBERT     2,527,622
AUTOMATIC TEMPERATURE REGULATOR Filed Aug. 11, 1948     2 Sheets-Sheet 2

INVENTOR.
Fred Dibert
BY Frank C. Fearman
ATTORNEY

Patented Oct. 31, 1950

2,527,622

UNITED STATES PATENT OFFICE 2,527,622

AUTOMATIC TEMPERATURE REGULATOR

Fred Dibert, Flint, Mich.

Application August 11, 1948, Serial No. 43,665

11 Claims. (Cl. 236—99)

This invention relates to an automatic temperature regulator for domestic heating equipment, and more particularly to a remote controlled thermo-responsive valve for regulating the rate of fuel flow to a liquid fuel burner supplied from a gravity type reservoir.

The primary object of the invention is to provide a remote controlled thermo-responsive valve for regulating fuel flow to a burner which will maintain a high or low burner flame depending upon the temperature in the space being heated and which is capable of being adjusted such that a predetermined temperature in said space will be maintained within a very small range of temperature changes.

Another object is to provide a remote controlled thermo-responsive valve for heating equipment which can be conveniently installed in present burner equipment without necessitating various structural changes in the equipment.

Another object is to provide an automatic temperature regulator which can be adjusted such that minimum temperature changes in the space being heated will deflect the control valve and regulate the rate of fuel flow to the burner equipment.

Another object is to provide an automatic remote controlled thermo-responsive valve for regulating the rate of fuel flow to the burner in proportion inversely to the temperature changes in the space being heated. Thus, the rate of fuel feed will increase during a drop in room temperature and will decrease when the temperature rises within the limits of a predetermined temperature setting.

Another object is to provide an automatic temperature regulator of the above mentioned type which is compact and can readily be taken apart for cleansing purposes without necessitating dismantling of the various operating levers and devices.

Another object is to provide an automatic temperature regulator of the above mentioned type in which the liquid fuel supply to the burner will be automatically shut off in the event that the thermo-responsive actuating mechanism is damaged and ceases to function properly.

Another object is to provide an automatic thermo-responsive valve for regulating the fuel flow to a burner which is provided with a pilot valve for controlling the flow of fuel to the burner pilot, thereby eliminating the necessity of providing extraneous valves for the pilot burner.

Another object is to provide an automatic thermo-responsive regulator valve for controlling the rate of fuel flow along a fuel flow path of a burner from a gravity type reservoir in which all of the valve members are so arranged within a float chamber as to prevent leakage and to eliminate the use of various packing and sealing elements.

Another object is to provide an automatic remote controlled thermo-responsive valve which can be operated manually to control the fuel flow to the burner should the thermo-responsive motor become damaged or inoperative for any reason whatsoever.

Another object is to provide an automatic remote control thermo-responsive valve device capable of being optionally employed in heating systems already installed in a house or building as well as in new installations.

Another object resides in the provision of an automatic thermo-responsive valve for fuel burners with a limit valve to control or meter the fuel flow to the burner independently of the thermo-responsive valve so that maximum fuel flow will be governed and sudden flow along the fuel flow path will be prevented, as well as the resultant extinguishing of the flame of the burner.

Another object resides in the provision of an automatic remote control thermo-responsive valve with actuating levers, and a control valve which is sensitive and frictionless, and hence renders the control valve fully responsive to small temperature changes.

Another object is to provide an automatic remote control thermo-responsive valve in which the spring tension on the bellows control lever remains constant and adjustment is had to a degree of nicety by changing the position of the control lever, thermo-responsive bellows, control valve and restraining spring.

Another object is to provide an automatic remotely operated thermo-responsive control valve in which the operating lever is yieldingly connected to the valve member or plug to prevent damage to the valve assembly including the valve seat should excessive temperature be encountered after the control valve has been automatically cut off.

Another object is to provide an automatic remotely operated thermo-responsive valve in which an expansible fluid motor is employed for transmitting energy from the space being heated and controlled to the automatic fuel flow control valve.

Other objects and advantages will become apparent during the course of the following description of the accompanying drawings wherein—

Figure 1 is a side elevational view of the automatic thermo-responsive control valve embodying a preferred form of the invention, and showing a control unit which is intended to be employed in connection with certain burner installations.

Figure 2 is a top elevational view of the control valve unit showing the capillary control tube which is adapted to be placed in a space to be heated remote from the control unit.

Figure 3 is a vertical cross-sectional view taken through the right hand end of the thermo-responsive control unit showing various details of construction, and the arrangement of the control, pilot and metering valves.

Figure 6:
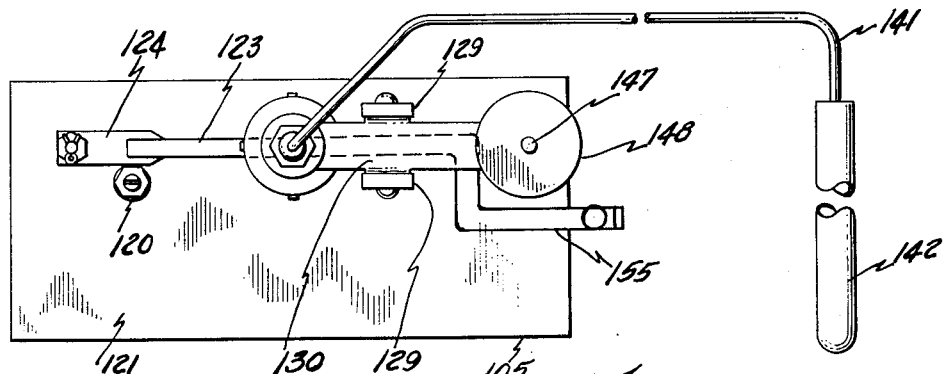
Figures 4, 5:
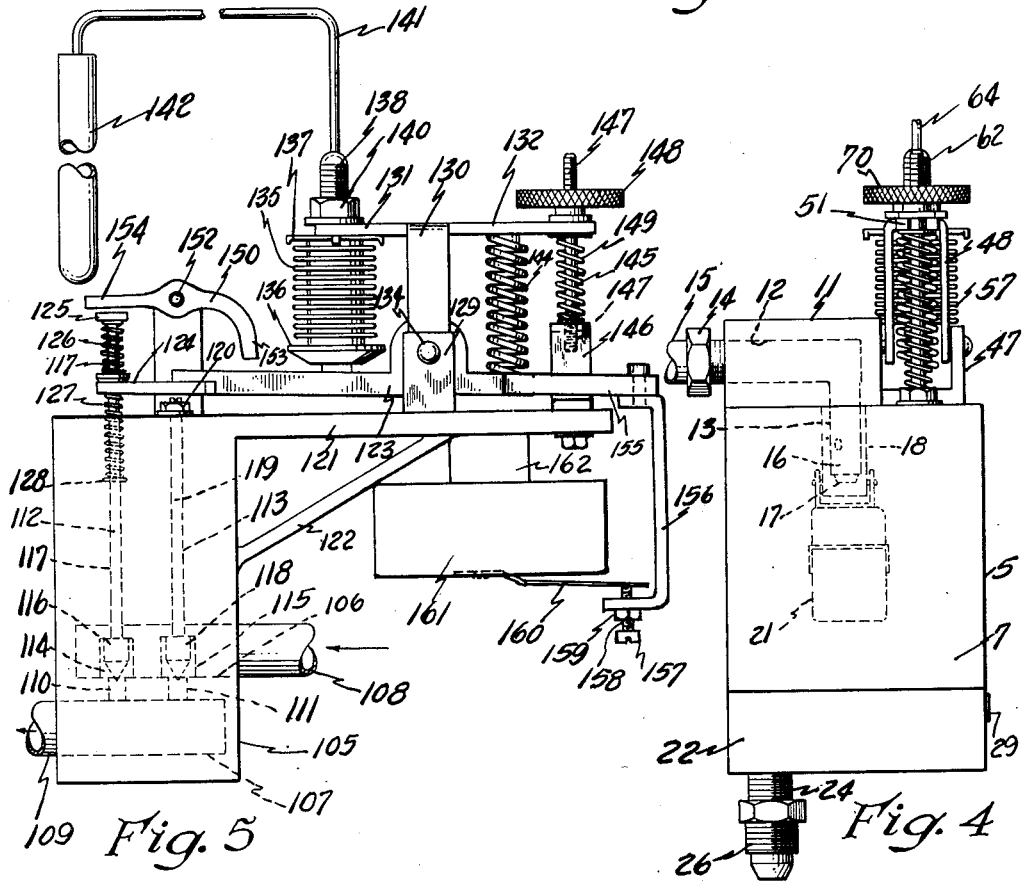
Figure 4 is an end elevational view of the automatic thermo-responsive control valve showing the manner in which the fuel is supplied to the float chamber of the device.

Figure 5 is a side elevational view of a slightly modified form of the invention showing an automatic thermo-responsive control unit which is capable of being interposed in the fuel flow path of previously installed burner systems which are provided with a carburetor and float chamber, and Figure 6 is a top elevational view of the form of the invention shown in Figure 5 illustrating the arrangement of the various operating elements and showing the capillary tube and bulb in position.

In the drawings, and more in detail, attention is directed to Figures 1 to 4 inclusive, wherein there is shown a preferred embodiment of the invention, and for the purpose of convenience of illustration there is indicated a casting generally designated 5 of rectangular shape to provide side, end and bottom walls 6, 7 and 8 respectively. The casting 5 is adapted to form a liquid fuel chamber 9 open at its upper end, and is provided with a closure plate 10. Suitable machine screws or the like are employed for retaining the cover plate in position or if desired, other fastening means can be employed.

Formed integral with the cover plate 10 is an enlarged portion 11 having a horizontal bore 12 extending inwardly from one end thereof and terminating a slight distance from the opposite end in a downwardly extending bore 13. The open end of the bore 12 is internally threaded for receiving a correspondingly threaded pipe nipple 14 for connecting a fuel supply line 15 thereto. The fuel supply pipe has its opposite end connected to a gravity type reservoir (not shown) for supplying liquid fuel to the fuel chamber 9.

Mounted in the lower portion of the bore 13 is an inlet valve 16 having a control plunger 17. Depending from the underside of the cover 10 is a bracket 18 to which is pivotally attached one end of a float lever 19 as at 20. The free swinging end of the float lever 19 has attached thereto a float 21, and the intermediate portion of said lever is presented to the valve plunger 17 to engage said plunger when the float is raised and thereby cut off the fuel supply to the liquid fuel float chamber 9.

The bottom wall 8 of the casting 5 is formed with one extension 22 adjacent one end and said extension is formed with a bore 23 having internal screw threads for receiving a correspondingly threaded nipple 24. One end of the nipple 24 is formed with a valve seat 25, while the opposite end is threaded as at 26 for receiving a pipe fitting for connecting a fuel supply pipe to the fuel burner.

Communicating with the vertical bore 23 and also formed in the extension 22 is a horizontal bore 27 which extends inwardly from one side of the extension and has its outer end closed by a removable closure plug 29. Formed in the bottom wall 8 of the casting 5 and communicating with one end of the bore 27, is a vertical bore 30 which is adapted to permit fuel flow from said fuel reservoir 9 to the outlet nipple 24 and fuel burner (not shown).

The upper portion of the vertical bore 30 is provided with a hollow valve guide 31 having a valve seat 32 and an inlet opening 33 communicating the interior of the liquid fuel chamber 9 with the vertical bore 30. Slidably mounted in the valve guide 31 is a valve plug 34 having a pointed end portion 35 adapted to engage the valve seat 32 and arrest liquid fuel flow from the chamber 9 to the outlet fitting 24. Formed integral with the valve plunger 34 is a control rod 36 which extends upwardly and projects through an opening 37 (Fig. 3) in the cover plate 10.

The actuating mechanism for the valve 34 is mounted on the cover plate 10, and it is to be noted that the opening 37 is of greatly increased diameter so that the cover plate may be raised and displaced to facilitate cleaning of all of the valve parts and fuel chamber 9. The actuating mechanism comprises a fulcrum lever 40 rockably mounted on a knife edge projection 41 extending upwardly and formed integral with the cover plate 10. The underside of the fulcrumed actuating lever 40 being notched to accommodate the projection and permit rocking movement of said lever. One end of the fulcrumed actuating lever 40 is provided with an extension 42 having an aperture for the passage of the valve control rod 36, and said extension is held in place by suitable fastening means or formed integral with said actuating lever. Opposed coil springs 43 and 44 are mounted on the valve rod 36 on opposite sides of the extension 42, with one end of each coil spring in abutting relation with the lever, and the opposite ends in abutting relation with annular flanges 45 and 46 on the valve rod 36. Thus, rocking movement of the fulcrumed actuating lever 40 will cause longitudinal movement of the valve control rod 36 until after the valve 34 has seated when continued movement of the actuating lever will compress the coil spring 44 after overcoming the yielding action thereof. The purpose of the coil spring 43 is to permit longitudinal movement of the valve control rod 36 in a manner which will be hereinafter more fully described.

Also formed integral with or attached to the cover plate 10 on each side of the knife edge 41 is a pair of upstanding spaced arms 47, between which is rockably mounted a U-shaped frame 48 on a pivot pin 49. The frame 48 is provided with opposed arms 50 and 51 arranged above the ends of the fulcrumed actuating lever 40. Interposed between the arm 50 and the end 52 of the actuating lever 40 is a coil spring 53 which has one end held in place on a round projection 54 on the underside of the arm 50, while the other end is held in place on a round projection 55 on the upper side of the fulcrumed actuating lever end 52.

Mounted between the other end 51 of the frame 48 and the fulcrumed actuating lever 40 on the other side of the knife edge fulcrum 41, is a bellows 57 of the expansible type and the lower end of said bellows is supported on a cup 58 attached to the lever 40 as at 59. The upper end engages a retaining disk 60 on the underside of the arm 51, and a threaded projection 62 on said bellows projects through an opening in the arm 51 and is held in place by a retaining nut 63. A capillary tube 64 is connected to the threaded extension 62 and communicates with the interior of the expansible bellows 57. The other end of the capillary tube is attached to a bulb 65 which may be placed in a remote location in the space of the house or building being heated. Thus, expansion of the liquid or gas within the bulb 65 will expand the bellows 57 and urge the fulcrumed actuating lever 40 in a direction to seat the valve 34. It is intended that the expansion and contraction of the bellows 57 be critical to such an extent as to cause movement of the actuating lever 40 in changes of temperature as low as one degree, and that each unit change of temperature will move the actuating lever 40 a proportional distance. This movement effects control of the regulating valve 34 to a degree of nicety so that the burner flame will rise and fall in accordance with the temperature changes.

In order to maintain the frame 48 in a predetermined position and to obtain the temperature range desired, a rod 66 has its lower end threaded in the cover plate 10 and held in place by a lock nut 67. The upper end of the rod 66 is threaded as at 68 and extends through an opening in the free end of the arm 50 of said frame. A coil spring 69 surrounds the rod 66, and has its lower end arranged in abutting relation with the lock nut 67, while its upper end is arranged to abut the arm 50 of the frame 48. A knurled thumb nut 70 is threaded on the upper end 68 of the rod to facilitate adjustment and positioning of the valve 34. Since the tension of the spring 53 is constant, it will readily be seen that movement of the frame by adjustment of the nut 70 will move the actuating arm 40 a corresponding distance, and similarly the valve 34 will be moved a corresponding distance toward or away from its seat 32 to provide an initial setting. Thus, the expansion and contraction of the bellows 57 under temperature changes will move the valve 34 from the set position to increase or decrease the flow to the burner in reverse proportion to the temperature change. For instance, if the temperature rises the valve 34 will move from its set position toward the seat 32 to restrict the fuel flow to the burner and decrease the flame thereof. Conversely, when a temperature drop occurs the bellows 57 will be contracted and the valve 34 will be moved away from its seat 32 to increase the fuel flow to the burner with a resultant increase in the flame intensity thereof.

Also extending upwardly from the cover plate 10 and formed integral therewith is an arm 72 to which is pivoted a safety lever 73 as at 74. The safety lever 73 is provided with a downwardly extending portion 75 spaced a slight distance above the fulcrumed actuating lever 40 (Fig. 1). The other end 76 of the safety lever 73 is arranged in abutting relation with the annular projection 45 on the upper end of the valve control rod 36. Thus, should the bellows 57 become inoperative through gas or fluid leakage and contract, the fulcrum lever 40 will move upwardly under the yielding action of the coil spring 53 and rock the actuating lever 40 so that the extension 42 will move upwardly and engage the depending arm 75 of the safety lever 73, and force the opposite end 76 downwardly to seat the valve 34 and thus close the fuel passage and flow to the oil burner, whereupon the burner flame will be cut out, and extinguished.

In order to maintain a pilot flame when the fuel flow has been cut off, a bore 77 is formed in the bottom wall of the casing 5 which has communication with the bore 27. A valve 78 is arranged above the bore 77, and said valve is provided with a valve stem 79 having an annular flange 80 which forms an abutment for one end of a coil spring 81 which surrounds the valve 78. The other end of the coil spring being arranged to abut the bottom wall of the chamber 9. The valve rod extends upwardly and passes through an opening 82 in the cover plate 10, and said opening is threaded for receiving the correspondingly threaded end 83 of the valve rod 79. A lock nut 84 is also threaded on the end 83 to retain the rod 79 in an adjusted position.

The flow passage to the burner can be limited by means of a manual control valve, including a rod 85 which extends through a bore 86 in the side wall 6 of the housing so that the lower pointed end 87 may be moved toward and away from the valve seat 25 of the outlet nipple 24. The upper end of the bore 86 is enlarged as at 88, and a coil spring 89 surrounds the valve rod 85 and has one end in abutting relation with a washer or the like 90 affixed to said rod, while the other end is in engagement with a block 91 arranged between the cover plate 10 and the upper end of the bore 86—88. The upper portion of the valve rod 85 extends through an opening 92 in the cover plate 10, and the extreme free upper end 93 of said rod has a control handle 94 affixed thereto. Mounted beneath the control handle 94 and secured to the cover plate 10 is a tubular extension 96 having an annular flange 97 (Fig. 2), and an annular projection 98. The upper surface of the annular projection is stepped as at 99, and is adapted to be engaged by a depending pin 100 affixed to the underside of the control handle 94. Thus, when the handle 94 is turned the pin 100 will travel along said stepped surfaces 99 and raise or lower the limit flow valve rod 85 a corresponding distance so as to move the needle end of the valve 87 toward and away from the seat 25. The annular flange 97 may be graduated and have markings thereon to indicate the various positions of the valve rod 85 and the hand wheel 94 is provided with a pointer 101 directly above the depending pin 100 to register with the graduation markings (not shown) on the annular flange 97.

Similarly, the knurled thumb nut 70 may be graduated by being provided with temperature indication markings and an arrow or other mark may be placed on the frame arm 50 so that the temperature graduations may be brought into registry therewith when selecting a predetermined temperature to be maintained by the burner.

In the modified form of the invention shown in Figures 5 and 6 an automatic remote control thermo-responsive burner regulator is illustrated for fuel burners having a carburetor. The regulator unit shown in Figures 5 and 6 is intended to be interposed in the fuel flow path between the carburetor and the burner. The temperature regulator in Figures 5 and 6 is similar in construction to that illustrated and described in Figures 1 to 4 inclusive, and comprises a valve casing or housing 105 having bores 106 and 107 extending inwardly from opposite sides thereof and terminating in distance short of the other ends. The bore 106 has projecting thereinto an inlet pipe 108 from the burner carburetor, while the bore 107 has fitted therein an outlet pipe 109 adapted to be connected to the oil burner. The bores 106 and 107 are connected by vertical bores 110 and 111 spaced a slight distance apart (Fig. 5), and extending upwardly from the bore 106 in vertical alinement with the bores 110 and 111 is a pair of vertical bores 112 and 113 respectively. The bores 110 and 111 are of reduced diameter, and mounted thereabove is a pair of valve guides 114 and 115 similar to the valve guide 31 shown in the form of the invention illustrated in Figures 1 to 4 inclusive. The guides 114 and 115 being provided with seats and inlet openings likewise similar to the guide 31, Figures 1 to 4 inclusive, but not shown. A valve 116 is mounted within the guide 114 and is provided with a valve rod 117 which extends upwardly through the bore 112 and projects a slight distance above the upper surface thereof as shown in Figure 5. Similarly, a valve 118 is provided for the guide 115, and has affixed thereto a valve rod 119 extending upwardly through the bore 113. An adjusting nut 120 is threaded on the upper end of the valve rod 119 to facilitate adjustment of the valve 118 and permit a slight amount of fuel to flow to the burner to maintain a pilot light.

The upper portion of the housing 105 has formed integral therewith a lateral extension 121 which is reinforced by a brace 122, and said extension 121 forms a support for the actuating mechanism of the control valve 116.

Rockably mounted on a knife edge fulcrum extending upwardly from the extension 121 is a control lever 123 in substantially the same manner as the control lever 40, Figures 1 to 4, is mounted. Formed integral with one end of the control lever 123 is an extension 124 having an opening in its free swinging end through which extends the upper portion of the valve control rod 117. The upper end of the control rod 117 is provided with a head 125 which forms an abutment for one end of the coil spring 126, the other end of which is in engagement with the extension 124. Similarly, the coil spring 127 encircles the valve rod 117 and has one end arranged in abutting relation with an annular extension 128 on the rod 117, while its other end engages the underside of the extension 124.

Extending upwardly from the lateral extension 121 on each side of the control lever 123 is a pair of arms 129 between which is pivotally mounted a U-shaped frame 130. Formed integral with the U-shaped frame and extending in opposite directions therefrom is a pair of arms 131 and 132 which overlie the control lever 123. The frame 130 is pivoted between the upstanding arms 129 by means of a pivot pin 134.

Mounted between the arm 131 and the control lever 123 is an expansible bellows 135 which has its lower end supported on a cup 136 affixed to the control lever 123, while its upper end is embraced by a retaining plate 137 beneath the arm 131. A threaded extension 138 is formed on the bellows 135 and extends through an opening in the arm 131 so that the bellows may be fastened in place by a retaining nut 140. A capillary tube 141 passes through the extension 138 and communicates with the bellows 135, and a capillary bulb 142 is connected to the free end of the tube 141 for being placed in a remote position or location from the burner.

A coil spring 144 is interposed between the other arm 132 of the frame and the control lever, and is held in place by retaining studs on the control lever and arm 123 and 132 respectively.

As in the case of Figures 1 to 4 inclusive, the tension of the spring 144 is constant and the frame 130 is shifted or adjusted by means of a rod 145 which has one end threaded in a support 146 as at 147, while its upper end projects through an opening in the arm 132 of the frame 130 and is threaded at its extreme upper end 147 for receiving a thumb nut 148. A coil spring 149 encircles the rod 145 to normally urge the arm 132 in an upward direction against the knurled thumb nut 148. By adjusting the thumb nut 148 as pointed out in connection with the form of the invention shown in Figures 1 to 4, the frame 130 may be adjusted to a maximum temperature desired in the space to be heated by regulating the position of the valve 116. Increase or decrease in temperature conditions will expand the gas or liquid in the bellows 135 and thus move the valve 116 to regulate the flow of fuel from the position of the setting or initial adjustment effected by the thumb nut 148.

A safety lever 150 is pivotally mounted on a bracket 151 extending upwardly from the top wall of the housing 105 by means of a pivot pin 152. One end of the safety lever 150 is provided with a downwardly extending portion 153 having its end terminating a short distance from the control lever 123. The other end of the control lever 154 is spaced a slight distance above the head 125 on the valve rod 117 so as to engage the head in the event that the bellows 135 becomes inoperative through any reason whatsoever and collapses. Upon such collapse or failure, the coil spring 144 will rock the control lever 123 so that the same will engage the downwardly extending projection 153 of the safety lever 150. When this occurs, the other end 154 of the safety lever will move downwardly into engagement with the head 125. Since the coil spring 144 has a greater compressional strength in comparison with the coil spring 126, the valve rod 117 will move downwardly and close the valve 116.

Formed integral with the control lever 123 is an offset extension 155 which has a depending bracket arm 156 angularly bent at its lower end as at 157. A contact screw 158 is adjustably mounted in the angular portion 157 and is adapted to be held in position by an adjusting nut 159. The contact screw 158 is adapted to engage a switch arm 160 of an electric switch 161 supported from the underside of the lateral housing extension 121 by means of a block 162. The switch structure is adapted to control the burner blower and may be adjusted by turning the contact screw 158. The electrical connections between the switch structure and the burner are not shown, but it will be readily apparent that the switch structure and its connections may be accomplished in accordance with present day burner installations. Further, it will be seen that when the valve 116 is raised to admit fuel flow to the burner that the switch will be operated to close a circuit through the burner relay or other mechanism not shown to energize the blower.

The operation of the modified form of the invention is similar to that disclosed in connection with the form of the invention in Figures 1 to 4 inclusive, and as pointed out above temperature changes in the space being heated will cause the control lever 123 to be shifted a corresponding distance and control the rate of fuel flow to the burner through the valve 116. The knurled thumb nut 148 may be provided with graduations to denote temperature in degrees (not shown), and similarly the arm 132 may be provided with an arrow or marker for registry with said temperature indication markings, likewise not shown.

It is to be understood, that the forms of the invention herewith shown and described are to be taken as preferred embodiments of the invention, and that various changes in the shape, size and arrangement of parts may be resorted to without departing from the spirit of the invention or the scope of the subjoined claims.

I claim:

1. An automatic temperature regulator for fuel burners, a valve housing, a valve interposed in the fuel flow path of said burner, a control lever rockably mounted on said housing, thermo-responsive means for controlling said valve to regulate the rate of fuel flow along said flow path, means for adjusting said thermo-responsive device and valve to a predetermined temperature setting, a remote control member for said thermo-responsive device, a safety lever pivotally mounted on said housing and operable by said control lever upon failure of said thermo-responsive device for closing said valve, and a pilot valve in said flow path independent of said first named valve.

2. An automatic temperature regulator for fuel burners, a valve housing interposed in the fuel path of said burner, a valve in said housing for controlling the rate of fuel flow along said flow path, a control lever rockably mounted on a knife edge fulcrum point on said housing, means for yieldingly connecting one end of said lever to the valve, a frame member having opposed arms rockably mounted on said housing above said control lever, thermo-responsive means between one of said arms and said control lever, yielding spring means between the other arm of said frame and control lever and means for adjusting the position of said frame and setting said valve to a predetermined temperature setting.

3. An automatic remote control thermo-responsive temperature regulator for fuel burners, a valve housing, a valve interposed in the fuel flow path of said burner, a casing having inlet and outlet openings, a valve in said casing for controlling the outlet opening, a lever rockably mounted on said casing having one end in engagement with said valve, a pivotally mounted frame arranged above said lever, a thermo-responsive device supported between said frame and one end of said lever, yielding means between said frame and the other end of said lever and means for adjusting said frame, a control switch on the housing, a bracket on the end of the control lever, and an adjustable contact member on said bracket for energizing said switch when the control lever is moved to predetermined position.

4. An automatic remote control thermo-responsive temperature regulator for fuel burners, a valve housing interposed in the fuel flow path of said burner, a valve in said housing for controlling the rate of fuel flow to said burner, a lever rockably mounted on said housing for actuating said valve, a movable frame mounted above said lever, a thermo-responsive bellows arranged between one end of said lever and frame, yielding spring means mounted between said frame and the other end of said lever, means for adjusting said frame and remote control means for said bellows, and a safety lever pivotally mounted on the housing and operable by said control lever upon failure of said thermo-responsive bellows.

5. An automatic remote control thermo-responsive temperature regulator for fuel burners, a valve housing interposed in the fuel flow path of said burner, a valve in said housing for controlling the rate of fuel flow to said burner, a lever rockably mounted on said housing for actuating said valve, a movable frame mounted above said lever, a thermo-responsive bellows arranged between one end of said lever and frame, yielding spring means mounted between said frame and the other end of said lever, means for adjusting said frame and remote control means for said bellows, said movable frame being rockably mounted with its pivot axis adjacent the axis of said control lever.

6. An automatic remote control thermo-responsive temperature regulator for fuel burners, a valve housing interposed in the fuel flow path of said burner, a valve in said housing for controlling the rate of fuel flow to said burner, a lever rockably mounted on said housing for actuating said valve, a movable frame pivotally mounted above said lever, a thermo-responsive bellows arranged between one end of said lever and frame, yielding spring means mounted between said frame and the other end of said lever, means for adjusting said frame and remote control means for said bellows, said lever being rockably mounted on a frictionless knife edge fulcrum.

7. An automatic remote control thermo-responsive temperature regulator for fuel burners, a valve housing having inlet and outlet openings adapted to be interposed in the fuel flow path of said burner, a valve in said housing for controlling the fuel outlet, a lever rockably mounted on said housing having one end in operative engagement with said valve, a thermo-responsive bellows for moving said arm in accordance with temperature changes, yielding spring means for closing said valve in the event said bellows becomes inoperative, and a safety lever on said frame and engageable by said lever for closing said valve.

8. An automatic remote control thermo-responsive temperature regulator for fuel burners of the gravity feed type, a valve housing having inlet and outlet openings, said valve casing being adapted to be interposed in the fuel flow path of said burner, a valve in said housing for controlling fuel flow through said outlet, a lever rockably mounted on said housing for actuating said valve, a frame movably mounted above said lever having opposed arms, a thermo-responsive bellows interposed between one of said arms and one end of the lever, yielding spring means interposed between the other end of said lever and said other arm, means for adjusting said frame, and means engageable with said lever for closing said valve in the event the thermo-responsive bellows becomes inoperative.

9. An automatic remote control thermo-responsive temperature regulator for fuel burners of the gravity feed type, a valve housing having inlet and outlet openings, said valve casing being adapted to be interposed in the fuel flow path of said burner, a valve in said housing for controlling fuel flow through said outlet, a lever rockably mounted on said housing for actuating said valve, a frame movably mounted above said lever having opposed arms, a thermo-responsive bellows interposed between one of said arms and one end of the lever, yielding spring means interposed between the other end of said lever and said other arm, means for adjusting said frame, and a pilot valve in said housing independent of said first named valve for supplying a small amount of fuel to said burner to maintain the pilot of said burner in operation.

10. An automatic remote control thermo-responsive temperature regulator for fuel burners of the gravity feed type, a valve housing having inlet and outlet openings, said valve casing being adapted to be interposed in the fuel flow path of said burner, a valve in said housing for controlling fuel flow through said outlet, a lever rockably mounted on said housing for actuating said valve, a frame movably mounted above said lever having opposed arms, a thermo-responsive bellows interposed between one of said arms and one end of the lever, yielding spring means interposed between the other end of said lever and said other arm, means for adjusting said frame, and a manual control valve independent of said first named valve for controlling the maximum rate of fuel to said burner.

11. An automatic remote control thermo-responsive temperature regulator for fuel burners of the gravity feed type, a valve housing having inlet and outlet openings, said valve casing being adapted to be interposed in the fuel flow path of said burner, a valve in said housing for controlling fuel flow through said outlet, a lever rockably mounted on said housing for actuating said valve, a frame movably mounted above said lever having opposed arms, a thermo-responsive bellows interposed between one of said arms and one end of the lever, yielding spring means interposed between the other end of said lever and said other arm, means for adjusting said frame, and spring means engageable with said frame for yieldingly urging said frame in one direction against said adjusting means.

FRED DIBERT.

REFERENCES CITED

The following references are of record in the file of this patent:

UNITED STATES PATENTS

| Number | Name | Date |
|---|---|---|
| 1,884,794 | McKee | Oct. 25, 1932 |
| 2,129,937 | Johnson | Sept. 13, 1938 |
| 2,242,718 | Dynes | May 20, 1941 |
| 2,286,630 | Landon et al. | June 16, 1942 |
| 2,387,793 | Holmes | Oct. 30, 1945 |